US012743995B2

(12) United States Patent
Shin et al.

(10) Patent No.: US 12,743,995 B2
(45) Date of Patent: Sep. 22, 2026

(54) DISPLAY DEVICE AND ELECTRONIC DEVICE

(71) Applicant: SAMSUNG DISPLAY CO., LTD., Yongin-si (KR)

(72) Inventors: Seung-Woon Shin, Yongin-si (KR); Kyoungsoo Kim, Yongin-si (KR); Jongdeuk Moon, Yongin-si (KR); Ho Lee, Yongin-si (KR); Woon-Rok Jang, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/254,482

(22) Filed: Jun. 30, 2025

(65) Prior Publication Data

US 2026/0155091 A1 Jun. 4, 2026

(30) Foreign Application Priority Data

Nov. 29, 2024 (KR) ........................ 10-2024-0174664

(51) Int. Cl.
*G09G 3/20* (2006.01)
*G09G 3/32* (2016.01)
(Continued)

(52) U.S. Cl.
CPC ............. *G09G 3/32* (2013.01); *G09G 3/3266* (2013.01); *G09G 3/3291* (2013.01); *G09G 2300/0413* (2013.01); *G09G 2300/0819* (2013.01); *G09G 2310/0267* (2013.01); *G09G 2310/0275* (2013.01); *G09G 2310/08* (2013.01); *G09G 2320/0233* (2013.01)

(58) Field of Classification Search
CPC ...... G09G 3/32; G09G 3/3266; G09G 3/3291; G09G 2300/0413; G09G 2300/0819; G09G 2310/0267; G09G 2310/0275; G09G 2310/08; G09G 2320/0233
USPC .......................................................... 345/55
See application file for complete search history.

(56) References Cited

U.S. PATENT DOCUMENTS 10,134,341 B2 11/2018 Bae
2018/0122302 A1* 5/2018 Koong ................ G09G 3/3266
(Continued)

FOREIGN PATENT DOCUMENTS

KR 10-2015-0017287 A 2/2015
KR 10-2019-0132763 A 11/2019
KR 10-2024-0141061 A 9/2024

*Primary Examiner* — Jennifer T Nguyen
(74) *Attorney, Agent, or Firm* — F. CHAU & ASSOCIATES, LLC

(57) ABSTRACT

A display device includes a plurality of pixels and a plurality of dummy pixels, a data driver connected to the plurality of pixels and the plurality of dummy pixels through data lines, a sensing circuit connected to the plurality of pixels and the plurality of dummy pixels through sensing lines, a scan driver configured to sequentially apply a scan signal and a first sensing signal to the plurality of pixels and the plurality of dummy pixels on a row-by-row basis in an active period of a frame period, to apply the scan signal and the first sensing signal to the plurality of pixels in a selected pixel row in a first period within a blank period of the frame period, and to apply a second sensing signal to the plurality of dummy pixels in a second period after the first period within the blank period.

19 Claims, 16 Drawing Sheets

(51) Int. Cl.
*G09G 3/3266* (2016.01)
*G09G 3/3291* (2016.01)

(56) References Cited

U.S. PATENT DOCUMENTS

| | | | | |
|---|---|---|---|---|
| 2019/0355309 | A1* | 11/2019 | Miwa | G09G 3/3233 |
| 2021/0201825 | A1* | 7/2021 | Yun | G09G 3/2003 |
| 2024/0363078 | A1* | 10/2024 | Kim | G09G 3/2096 |
| 2025/0239193 | A1* | 7/2025 | Hong | G09G 3/006 |

* cited by examiner

DISPLAY DEVICE AND ELECTRONIC DEVICE

CROSS-REFERENCE TO RELATED APPLICATION(S)

This U.S. patent application claims priority under 35 U.S.C. § 119 to Korean Patent Application No. 10-2024-0174664, filed on Nov. 29, 2024 in the Korean Intellectual Property Office (KIPO), the disclosure of which is incorporated by reference in its entirety herein.

1. TECHNICAL FIELD

Embodiments of the present inventive concept are directed to a display device, and more particularly to a display device that performs a sensing operation in a blank period, and an electronic device including the display device.

2. DISCUSSION OF RELATED ART

An Organic Light-Emitting Diode ("OLED") display device is a self-emissive flat-panel display in which each pixel generates light by passing current through organic materials layered between electrodes. Unlike Liquid Crystal Display ("LCD") devices, OLED display devices require no backlight, enabling high contrast ratios, true blacks, fast response times, wide viewing angles, and ultra-thin or flexible designs, making it ideal for smartphones, TVs, wearables, and automotive displays.

Even when pixels included in an OLED display device are manufactured by a common process, driving transistors of the pixels may have different driving characteristics (e.g., different mobility and/or different threshold voltages) from each other due to a process variation. Thus, the pixels may emit light with different luminance. Further, as the display device operates over time, the pixels may become degraded, and the driving characteristics of the driving transistors may become degraded.

To compensate for luminance non-uniformity and pixel degradation, the display device may perform a sensing operation to detect the driving characteristics of the driving transistors in the pixels. For example, a real-time sensing operation may be performed during a blank period of each frame period while the display device is operating, to senses driving characteristic of the pixels. However, such sensing during the blank period may unintentionally alter the luminance of the sensed pixel row, potentially introducing visible artifacts such as horizontal bright lines on the display.

SUMMARY

Some embodiments provide a display device and an electronic device including the display for reducing or preventing change of luminance of a pixel when a sensing operation is performed in a blank period.

According to an embodiment, there is provided a display device including a display panel including a plurality of data lines and a plurality of sensing lines, including a plurality of pixels in a display region, and further including a plurality of dummy pixels in a peripheral region adjacent to the display region, a data driver connected to the plurality of pixels and the plurality of dummy pixels through the plurality of data lines, a sensing circuit connected to the plurality of pixels and the plurality of dummy pixels through the plurality of sensing lines, and a scan driver configured to sequentially apply a scan signal and a first sensing signal to the plurality of pixels and the plurality of dummy pixels on a row-by-row basis in an active period of a frame period, to apply the scan signal and the first sensing signal to the plurality of pixels in a selected pixel row among the pixels in a first period within a blank period of the frame period, and to apply a second sensing signal to the plurality of dummy pixels in a second period after the first period within the blank period.

In an embodiment, in the first period, an initialization voltage may be applied to source nodes of the plurality of pixels in the selected pixel row through the plurality of sensing lines. In the second period, the initialization voltage may be applied to source nodes of the plurality of dummy pixels through the plurality of sensing lines.

In an embodiment, a voltage level of the initialization voltage at a falling edge of the first sensing signal applied to the plurality of pixels in the selected pixel row in the first period may be substantially equal to a voltage level of the initialization voltage at a falling edge of the first sensing signal applied to the plurality of pixels in the selected pixel row in the active period.

In an embodiment, a falling edge of the first sensing signal applied to the plurality of pixels in the selected pixel row in the first period may lag behind a rising edge of the second sensing signal applied to the plurality of dummy pixels in the second period.

In an embodiment, data voltages applied to the plurality of dummy pixels in the active period of the frame period may be data voltages applied to the plurality of pixels in a pixel row subsequent to the selected pixel row in an active period of a previous frame period.

In an embodiment, data voltages applied to the plurality of dummy pixels in the active period of the frame period may correspond to a fixed gray level.

In an embodiment, the plurality of pixels may be arranged in the first through N-th pixel rows, where N is an integer greater than or equal to 2, and the plurality of dummy pixels may be arranged in an (N+1)-th pixel row.

In an embodiment, the selected pixel row may be randomly selected from the first through N-th pixel rows in each frame period.

In an embodiment, the peripheral region may be a black matrix region surrounding the display region.

In an embodiment, the display panel may be driven at a variable frame frequency, and a time length of the blank period may be changed according to the variable frame frequency.

In an embodiment, each of the plurality of pixels and the plurality of dummy pixels may include a driving transistor including a gate connected to a gate node, a first terminal which receives a first power supply voltage, and a second terminal connected to a source node, a scan transistor configured to connect a corresponding data line among the plurality of data lines to the gate node in response to the scan signal, a sensing transistor configured to connect a corresponding sensing line among the plurality of sensing lines to the source node in response to the first sensing signal, a storage capacitor connected between the gate node and the source node, and a light-emitting element including an anode connected to the source node, and a cathode which receives a second power supply voltage. Each of the plurality of dummy pixels may further include an initialization transistor configured to connect the corresponding sensing line to the source node in response to the second sensing signal.

In an embodiment, the scan transistor may include a gate which receives the scan signal, a first terminal connected to the corresponding data line, and a second terminal connected to the gate node, the sensing transistor may include a gate which receives the first sensing signal, a first terminal connected to the corresponding sensing line, and a second terminal connected to the source node, and the initialization transistor may include a gate which receives the second sensing signal, a first terminal connected to the corresponding sensing line, and a second terminal connected to the source node.

In an embodiment, the sensing transistor of each of the plurality of pixels in the selected pixel row may apply an initialization voltage to the source node of each of the plurality of pixels in the selected pixel row in the first period, and the initialization transistor of each of the plurality of dummy pixels may apply the initialization voltage to the source node of each of the plurality of dummy pixels in the second period.

In an embodiment, the blank period may include an initialization period in which a sensing data voltage is applied to the gate node of each of the plurality of pixels in the selected pixel row and the initialization voltage is applied to the source node of each of the plurality of pixels in the selected pixel row, a sensing period in which a sensing operation is performed on the plurality of pixels in the selected pixel row, a rewrite period in which a previous data voltage is applied to the gate node of each of the plurality of pixels in the selected pixel row and the initialization voltage is applied to the source node of each of the plurality of pixels in the selected pixel row, and a dummy initialization period in which the initialization voltage is applied to the source node of each of the plurality of dummy pixels. The first period may be the rewrite period, and the second period may be the dummy initialization period.

In an embodiment, the previous data voltage may be substantially equal to a data voltage applied to each of the plurality of pixels in the selected pixel row in the active period.

In an embodiment, the sensing circuit may include a sensing channel configured to perform the sensing operation, an initialization switch configured to apply the initialization voltage to the sensing line in response to an initialization switching signal, and a sampling switch configured to connect the sensing line to the sensing channel in response to a sampling switching signal.

According to an embodiment, there is provided a display device including a display panel including a plurality of data lines and a plurality of sensing lines, including a plurality of pixels in a display region, and further including a plurality of dummy pixels in a peripheral region adjacent to the display region, a data driver connected to the plurality of pixels and the plurality of dummy pixels through the plurality of data lines, a sensing circuit connected to the plurality of pixels and the plurality of dummy pixels through the plurality of sensing lines, and a scan driver configured to apply a scan signal and a first sensing signal to the plurality of pixels and the plurality of dummy pixels, and to further apply a second sensing signal to the plurality of dummy pixels. Each of the plurality of pixels and the plurality of dummy pixels includes a driving transistor including a gate connected to a gate node, a first terminal which receives a first power supply voltage, and a second terminal connected to a source node, and a light-emitting element including an anode connected to the source node, and a cathode which receives a second power supply voltage. Each of the plurality of dummy pixels further includes an initialization transistor configured to connect a corresponding one of the sensing lines to the source node in response to the second sensing signal.

In an embodiment, the scan driver may sequentially apply the scan signal and the first sensing signal to the plurality of pixels and the plurality of dummy pixels on a row-by-row basis in an active period of a frame period, may apply the scan signal and the first sensing signal to the plurality of pixels in a selected pixel row in a first period within a blank period of the frame period, and may apply the second sensing signal to the plurality of dummy pixels in a second period after the first period within the blank period.

According to an embodiment, there is provided an electronic device including a processor, a memory connected to the processor, a power module connected to the processor, and a display device configured to receive input image data from the processor, and to display an image based on the input image data. The display device includes a display panel including a plurality of data lines and a plurality of sensing lines, including a plurality of pixels in a display region, and further including a plurality of dummy pixels in a peripheral region adjacent to the display region, a data driver connected to the plurality of pixels and the plurality of dummy pixels through the plurality of data lines, a sensing circuit connected to the plurality of pixels and the plurality of dummy pixels through the plurality of sensing lines, a scan driver configured to sequentially apply a scan signal and a first sensing signal to the plurality of pixels and the plurality of dummy pixels on a row-by-row basis in an active period of a frame period, to apply the scan signal and the first sensing signal to the plurality of pixels in a selected pixel row in a first period within a blank period of the frame period, and to apply a second sensing signal to the plurality of dummy pixels in a second period after the first period within the blank period, and a controller configured to control the data driver, the sensing circuit and the scan driver.

In an embodiment, each of the plurality of pixels and the plurality of dummy pixels may include a driving transistor including a gate connected to a gate node, a first terminal which receives a first power supply voltage, and a second terminal connected to a source node, and a light-emitting element including an anode connected to the source node, and a cathode which receives a second power supply voltage. Each of the plurality of dummy pixels may further include an initialization transistor configured to connect a corresponding one of the sensing lines to the source node in response to the second sensing signal.

As described above, in a display device and an electronic device according to an embodiment, a display panel may include a plurality of pixels and a plurality of dummy pixels. A scan driver may apply a scan signal and a first sensing signal to the plurality of pixels in a selected pixel row in a first period within a blank period, and may apply a second sensing signal to the plurality of dummy pixels in a second period after the first period within the blank period. Accordingly, changes in luminance of the selected pixel row on which a sensing operation is performed during the blank period may be reduced or prevented, and the appearance of a horizontal bright line on the display panel may be avoided, thereby enhancing the viewing experience for the user.

BRIEF DESCRIPTION OF THE DRAWINGS

Illustrative, non-limiting embodiments will be more clearly understood from the following detailed description in conjunction with the accompanying drawings.

DETAILED DESCRIPTION

At least one embodiment of the present invention concept is directed to a display device and method for reducing visual artifacts, such as horizontal bright lines, during sensing operations. A display panel of the display device may include a plurality of dummy pixels in a peripheral region. During a blank period, after a sensing operation for a selected pixel row is performed in a first period, a second sensing signal is applied to the dummy pixels in a second period following the first period. By applying the second sensing signal to the dummy pixels within the blank period, the voltage level of the initialization voltage during a data rewrite operation in the blank period can be made substantially equal to the initialization voltage during a data write operation in an active period. As a result, the luminance of the selected pixel row remains uniform, and perception of a horizontal bright line by a user can be prevented.

Hereinafter, embodiments of the present inventive concept will be explained in detail with reference to the accompanying drawings.

Figure 1:
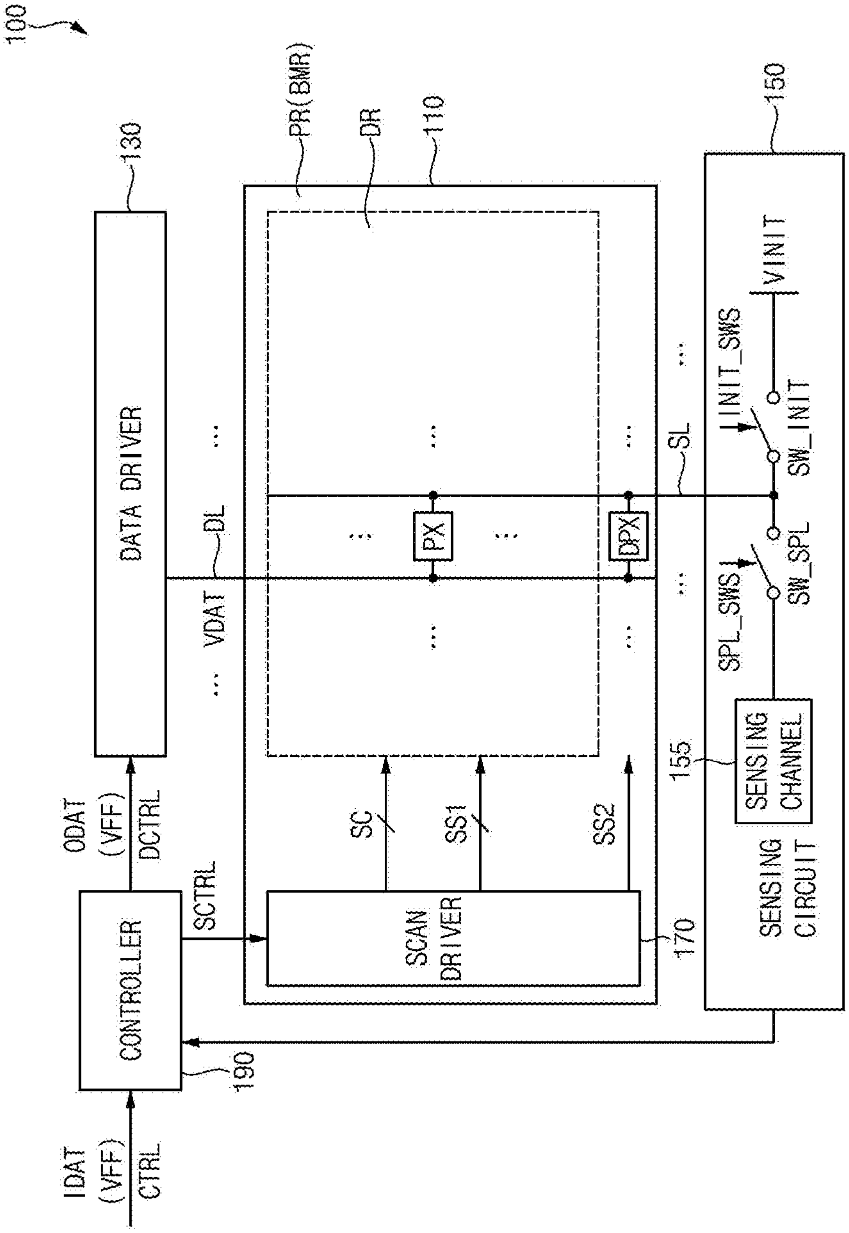
FIG. 1 is a block diagram illustrating a display device according to an embodiment.
Figure 2:
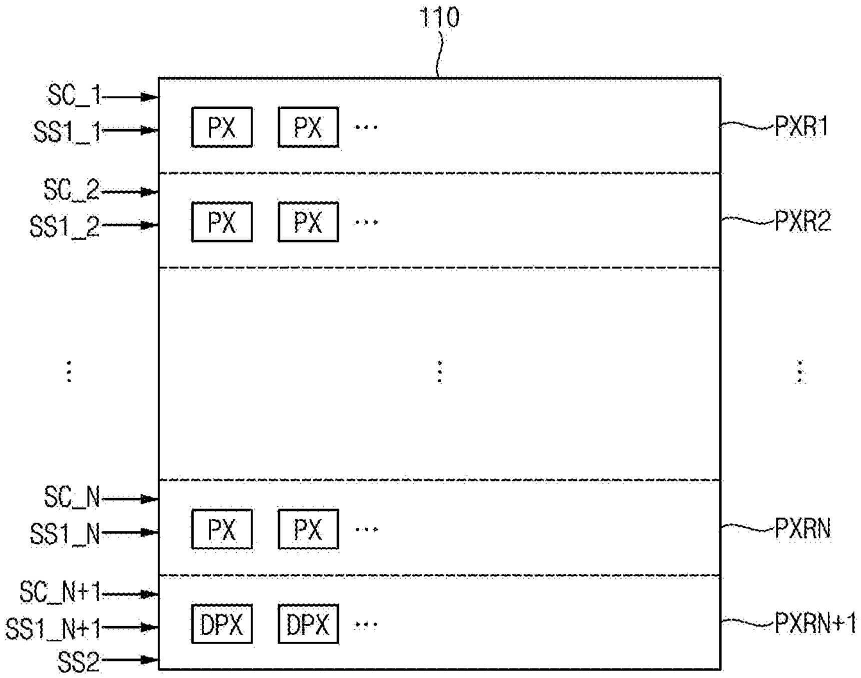
FIG. 2 is a diagram illustrating an example of a display panel in which a plurality of pixels and a plurality of dummy pixels are arranged.
Figure 3:
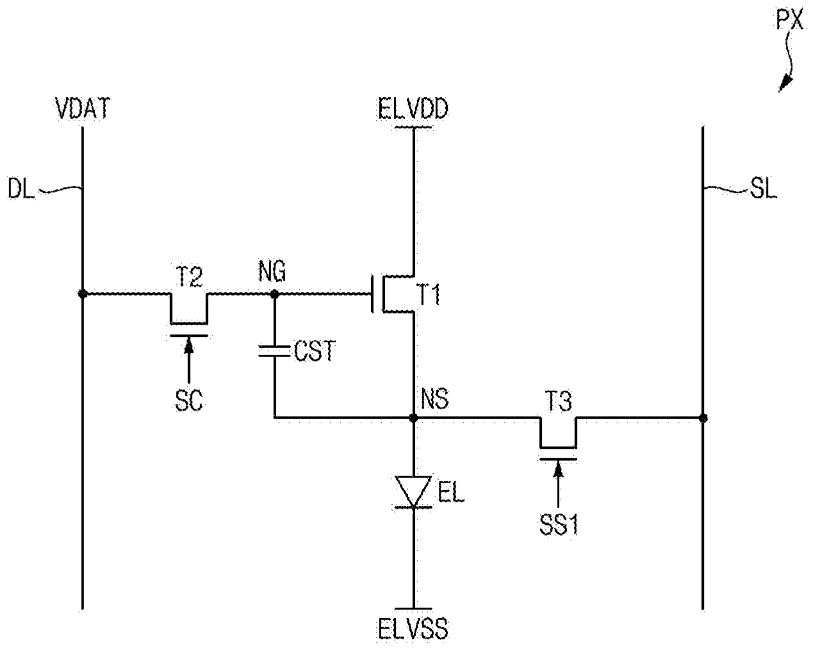
FIG. 3 is a circuit diagram illustrating an example of a pixel included in a display device according to an embodiment.
Figure 4:
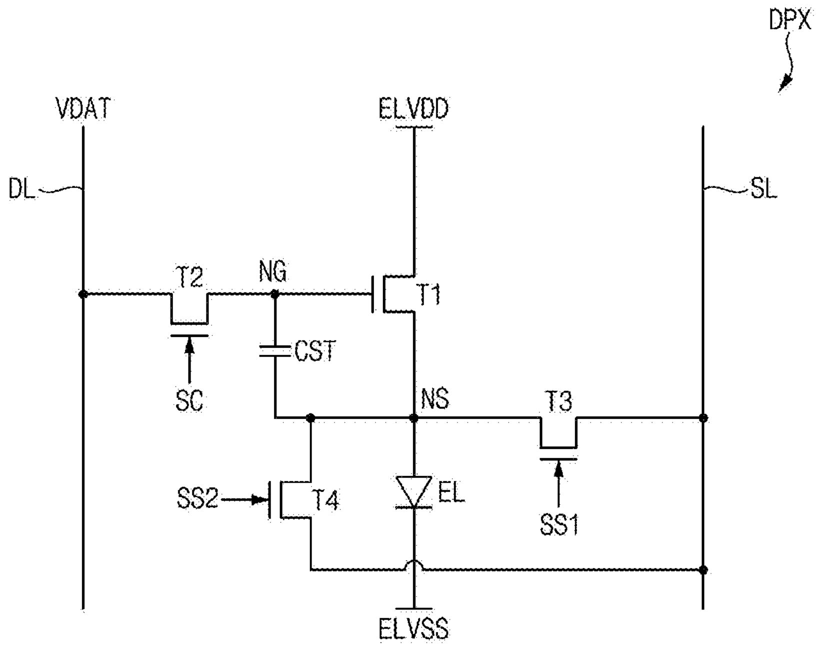
FIG. 4 is a circuit diagram illustrating an example of a dummy pixel included in a display device according to an embodiment.
Figure 5:
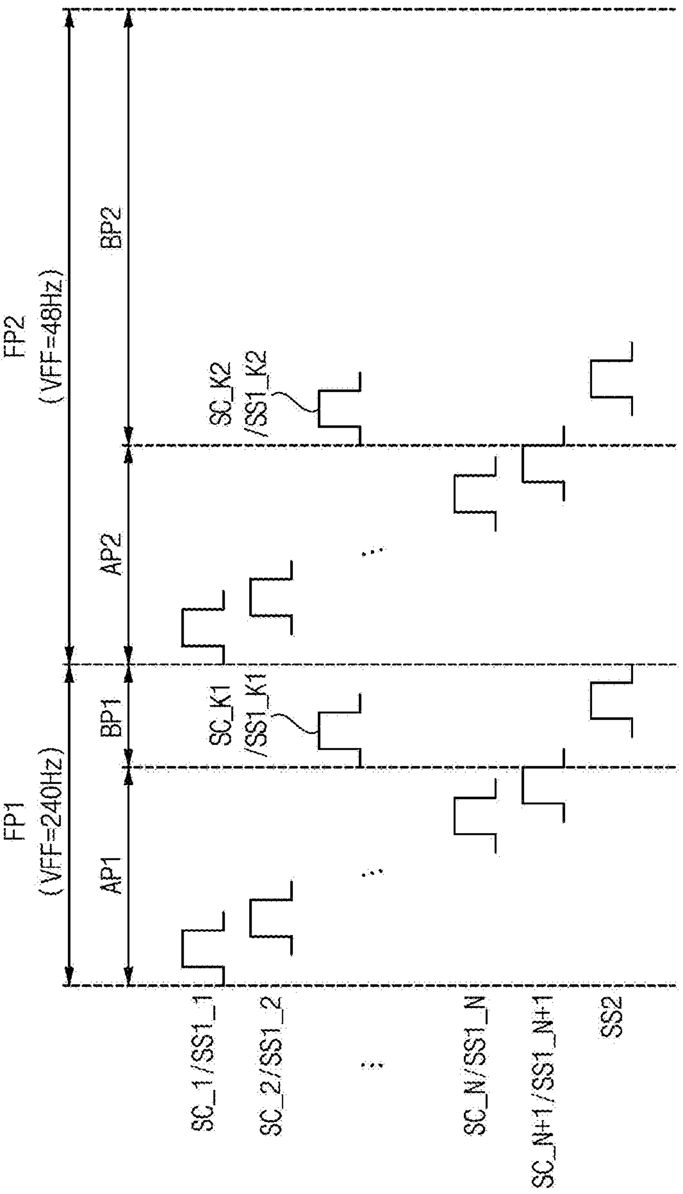
FIG. 5 is a timing diagram illustrating an example of a scan signal, a first sensing signal and a second sensing signal applied to a display panel driven at a variable frame frequency.
Figure 6:
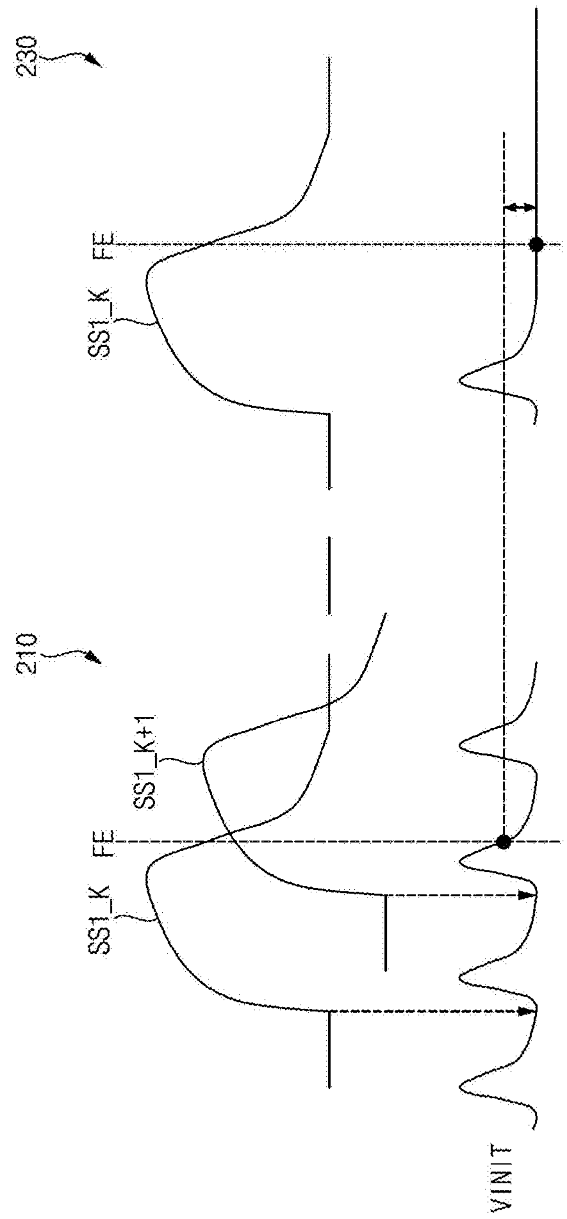
FIG. 6 is a diagram illustrating, in a case where a second sensing signal is not used, an example of an initialization voltage when a first sensing signal is applied to a K-th pixel row in an active period and an example of the initialization voltage when the first sensing signal is applied to the K-th pixel row in a blank period.
Figure 7:
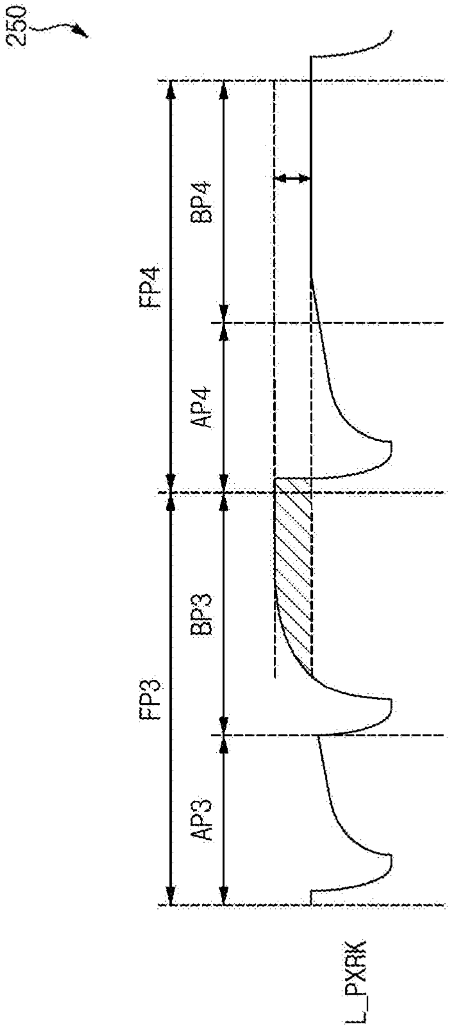
FIG. 7 is a diagram illustrating, in a case where a second sensing signal is not used, an example of luminance of a K-th pixel row in a frame period in which a sensing operation is performed and in a frame period in which the sensing operation is not performed.
Figure 8:
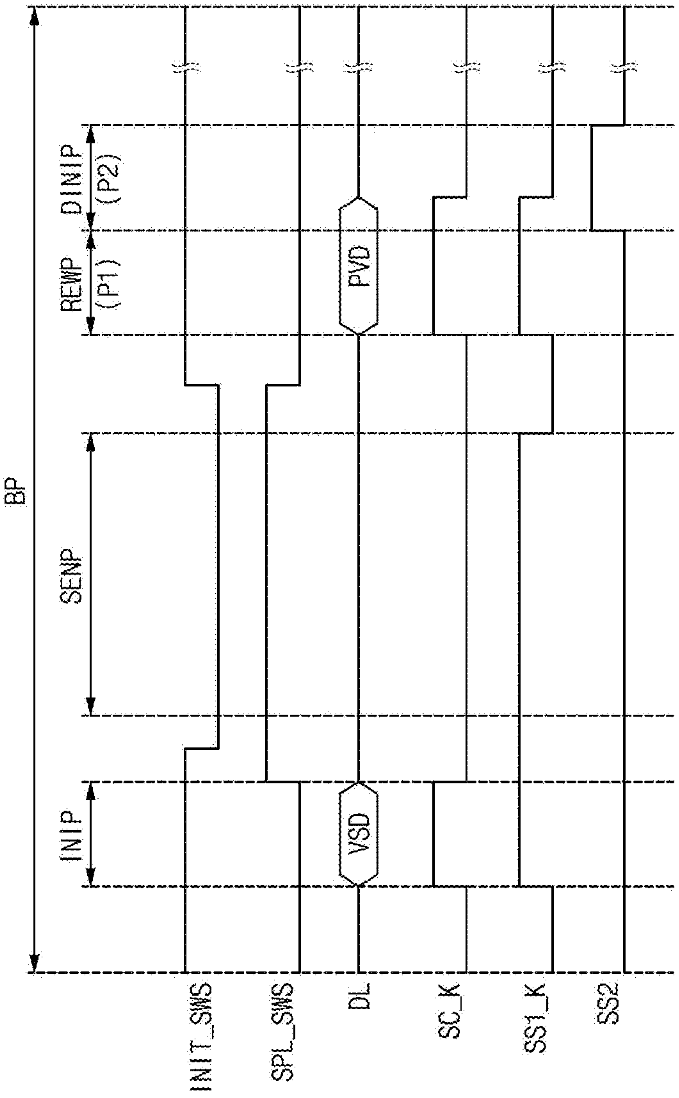
FIG. 8 is a timing diagram illustrating an initialization switching signal, a sampling switching signal, a scan signal for a K-th pixel row, a first sensing signal for the K-th pixel row and a second sensing signal in a blank period in which a sensing operation is performed for the K-th pixel row in a display device according to an embodiment.
Figure 9:
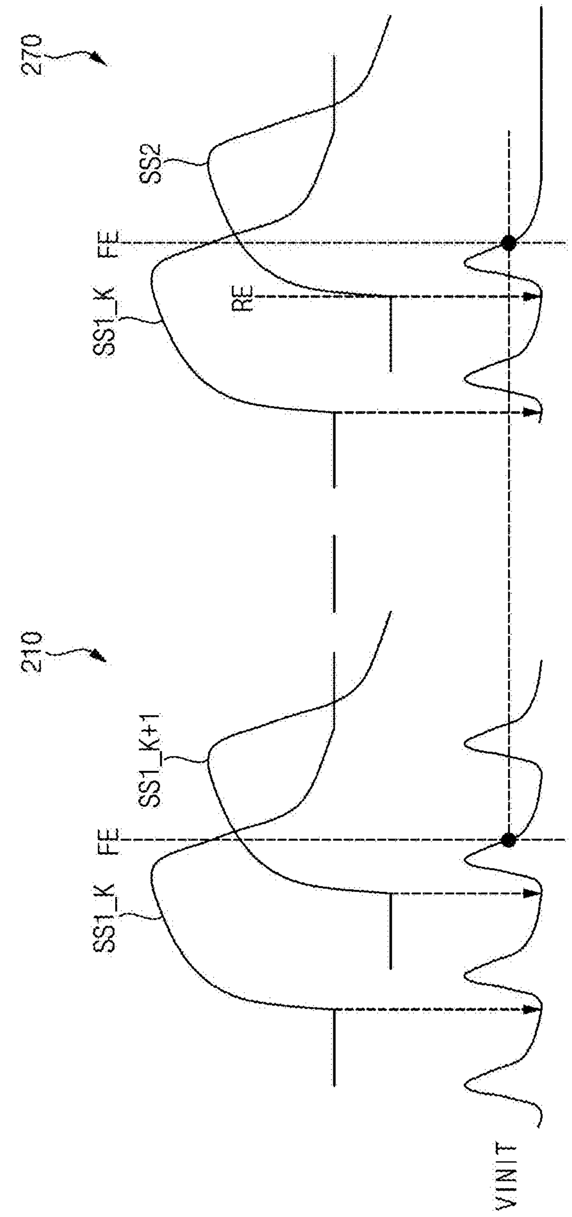
FIG. 9 is a diagram illustrating an example of an initialization voltage when a first sensing signal is applied to a K-th pixel row in an active period and an example of the initialization voltage when the first sensing signal is applied to the K-th pixel row in a blank period in a display device according to embodiments.
Figure 10:
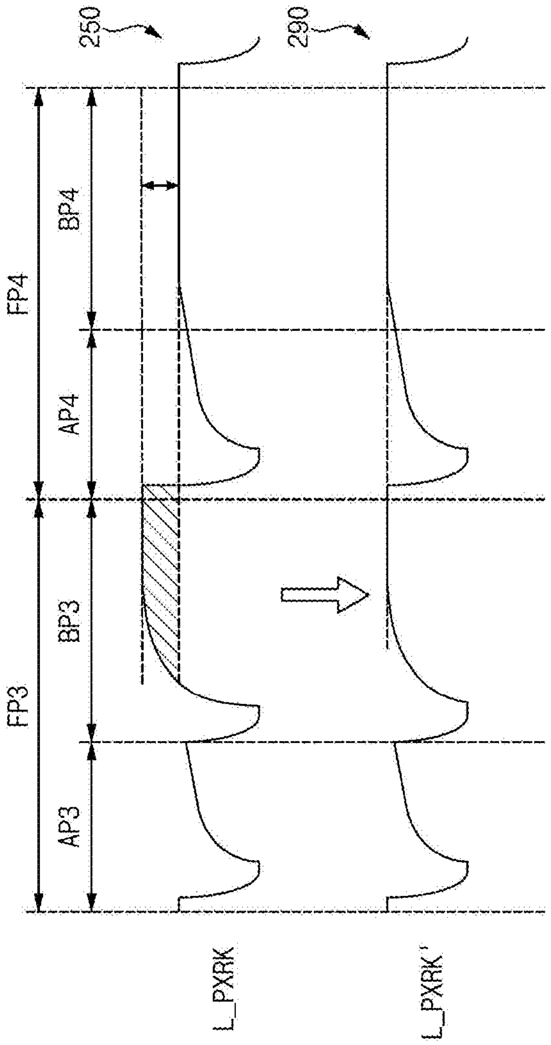
FIG. 10 is a diagram illustrating an example of luminance of a K-th pixel row in a frame period in which a sensing operation is performed and in a frame period in which the sensing operation is not performed in a display device according to an embodiment.

FIG. 1 is a block diagram illustrating a display device according to an embodiment. FIG. 2 is a diagram illustrating an example of a display panel of the display device in which a plurality of pixels and a plurality of dummy pixels are arranged. FIG. 3 is a circuit diagram illustrating an example of one of the pixels according to an embodiment. FIG. 4 is a circuit diagram illustrating an example of one of the dummy pixels according to an embodiment. FIG. 5 is a timing diagram illustrating an example of a scan signal, a first sensing signal and a second sensing signal applied to the display panel driven at a variable frame frequency. FIG. 6 is a diagram illustrating, in a case where a second sensing signal is not used, an example of an initialization voltage when a first sensing signal is applied to a K-th pixel row in an active period and an example of the initialization voltage when the first sensing signal is applied to the K-th pixel row in a blank period. FIG. 7 is a diagram illustrating, in a case where a second sensing signal is not used, an example of luminance of a K-th pixel row in a frame period in which a sensing operation is performed and in a frame period in which the sensing operation is not performed. FIG. 8 is a timing diagram illustrating an initialization switching signal, a sampling switching signal, a scan signal for a K-th pixel row, a first sensing signal for the K-th pixel row and a second sensing signal in a blank period in which a sensing operation is performed for the K-th pixel row in a display device according to an embodiment. FIG. 9 is a diagram illustrating an example of an initialization voltage when a first sensing signal is applied to a K-th pixel row in an active period and an example of the initialization voltage when the first sensing signal is applied to the K-th pixel row in a blank period in a display device according to an embodiment. FIG. 10 is a diagram illustrating an example of luminance of a K-th pixel row in a frame period in which a sensing operation is performed and in a frame period in which the sensing operation is not performed in a display device according to an embodiment.

Referring to FIG. 1, a display device 100 according to an embodiment includes a display panel 110 that includes a plurality of data lines DL, a plurality of sensing lines SL, a plurality of pixels PX and a plurality of dummy pixels DPX, a data driver 130 (e.g., a first driver circuit) connected to the plurality of pixels PX and the plurality of dummy pixels DPX through the plurality of data lines DL, a sensing circuit 150 connected to the plurality of pixels PX and the plurality of dummy pixels DPX through the plurality of sensing lines SL, a scan driver 170 (e.g., a second driver circuit) that sequentially applies a scan signal SC and a first sensing signal SS1 to the plurality of pixels PX and the plurality of dummy pixels DPX on a row-by-row basis and applies a second sensing signal SS2 to the plurality of dummy pixels DPX, and a controller 190 (e.g., a controller circuit) that controls the data driver 130, the sensing circuit 150 and the scan driver 170.

The display panel 110 may include the plurality of data lines DL and the plurality of sensing lines SL, may include the plurality of pixels PX connected to the plurality of data lines DL and the plurality of sensing lines SL in a display region DR. In an embodiment, the display panel 110 further includes the plurality of dummy pixels DPX connected to the plurality of data lines DL in a peripheral region PR adjacent or surround the display region DR. The display panel 100 may further include the plurality of sensing lines SL partially in the display region DR and partially in the peripheral region PR. The display panel 110 may further include a plurality of scan signal lines for providing the scan signal SC to the plurality of pixels PX and the plurality of dummy pixels DPX, a plurality of first sensing signal lines for providing the first sensing signal SS1 to the plurality of pixels PX and the plurality of dummy pixels DPX, and a second sensing signal line for providing the second sensing signal SS2 to the plurality of dummy pixels DPX. In an embodiment, the peripheral region PR in which the plurality of dummy pixels DPX are arranged is a black matrix region BMR that surrounds the display region DR. Light emitted from the plurality of dummy pixels DPX may be blocked by the black matrix region BMR, and may not be provided to the outside. Further, in some embodiments, as illustrated in FIG. 2, in the display panel 110, the plurality of pixels PX may be arranged in first through N-th pixel rows PXR1, PXR2, . . . , and PXRN in the display region DR, where N is an integer greater than or equal to 2, and the plurality of dummy pixels DPX may be arranged in an (N+1)-th pixel row PXRN+1 in the peripheral region PR or the black matrix region BMR. That is, the plurality of dummy pixels DPX may be arranged in the (N+1)-th pixel row PXRN+1 subsequent to (or below) the N-th pixel row PXRN that is the last pixel row of the display region DR.

In some embodiments, as illustrated in FIGS. 3 and 4, compared with the pixel PX, each dummy pixel DPX may further include an initialization transistor T4 that receives the second sensing signal SS2. For example, as illustrated in FIG. 3, each pixel PX may include a driving transistor T1, a scan transistor T2, a sensing transistor T3, a storage capacitor CST and a light-emitting element EL.

The storage capacitor CST may be connected between a gate node NG and a source node NS. Further, the storage capacitor CST may store a voltage difference between a data voltage VDAT (alternatively, a sensing data voltage VSD or a previous data voltage PVD illustrated in FIG. 8) transferred through the data line DL and an initialization voltage VINIT transferred through the sensing line SL. In some embodiments, the storage capacitor CST may include a first electrode connected to the gate node NG, and a second electrode connected to the source node NS.

The scan transistor T2 may connect the data line DL to the gate node NG in response to the scan signal SC. That is, the scan transistor T2 may transfer the data voltage VDAT from the data line DL to the gate node NG in response to the scan signal SC. In some embodiments, the scan transistor T2 may include a gate which receives the scan signal SC, a first terminal connected to the data line DL, and a second terminal connected to the gate node NG.

The sensing transistor T3 may connect the sensing line SL to the source node NS in response to the first sensing signal SS1. In some embodiments, the sensing transistor T3 may include a gate which receives the first sensing signal SS1, a first terminal connected to the sensing line SL, and a second terminal connected to the source node NS.

The driving transistor T1 may generate a driving current based on the voltage difference stored in the storage capacitor CST. In some embodiments, the driving transistor T1 may include a gate connected to the gate node NG, a first terminal (e.g., a drain) which receives a first power supply voltage ELVDD (e.g., a high power supply voltage), and a second terminal (e.g., a source) connected to the source node NS.

The light-emitting element EL may emit light based on the driving current generated by the driving transistor T1. For example, the light-emitting element EL may be an organic light-emitting diode ("OLED"), a nano light-emitting diode ("NED"), a quantum dot ("QD") light-emitting diode, a micro light-emitting diode, an inorganic light-emitting diode, or any other suitable light-emitting element. In some embodiments, the light-emitting element EL may include an anode connected to the source node NS and a cathode which receives a second power supply voltage ELVSS (e.g., a low power supply voltage).

As illustrated in FIG. 4, each dummy pixel DPX may include not only the driving transistor T1, the scan transistor T2, the sensing transistor T3, the storage capacitor CST and the light-emitting element EL, but also the initialization transistor T4 which receives the second sensing signal SS2.

The initialization transistor T4 may connect the sensing line SL to the source node NS in response to the second sensing signal SS2. Thus, the initialization transistor T4 may apply the initialization voltage VINIT from the sensing line SL to the source node NS in response to the second sensing signal SS2, and the source node NS and the anode of the light-emitting element EL may be initialized based on the initialization voltage VINIT. In some embodiments, the initialization transistor T4 may include a gate which receives the second sensing signal SS2, a first terminal connected to the sensing line SL, and a second terminal connected to the source node NS.

Although FIG. 3 illustrates an example of the pixel PX having a 3T1C structure and FIG. 4 illustrates an example of the dummy pixel PX having a 4T1C structure, the pixel PX and the dummy pixel PX of the display device 100 according to embodiments are not limited to the examples of FIGS. 3 and 4. The pixel PX of the display device 100 according to embodiments may have any pixel structure, and the dummy pixel PX may further include the initialization transistor T4 compared with the pixel PX.

The data driver 130 may generate the data voltages VDAT based on output image data ODAT and a data control signal DCTRL received from the controller 190, and may provide the data voltages VDAT to the plurality of pixels PX and the plurality of dummy pixels DPX through the plurality of data lines DL in an active period of a frame period. Further, in the active period, the scan driver 170 may sequentially apply the scan signal SC and the first sensing signal SS1 to the plurality of pixels PX and the plurality of dummy pixels DPX on a row-by-row basis, and thus the data driver 130 may sequentially apply the data voltages VDAT to the plurality of pixels PX and the plurality of dummy pixels DPX on a row-by-row basis. In some embodiments, the data control signal DCTRL may include, but is not limited to, a data enable signal, a horizontal start signal, a load signal, etc.

In a blank period of the frame period, as described below with reference to FIG. 8, the data driver 130 may provide the sensing data voltage VSD to the plurality of pixels PX in a selected pixel row on which a sensing operation is performed. Further, within the blank period, after the sensing operation is performed, the data driver 130 may provide previous data voltages PVD to the plurality of pixels PX in the selected pixel row. Here, the previous data voltages PVD may be the data voltages VDAT applied to the plurality of pixels PX in the selected pixel row in the active period, i.e., an active period immediately before the sensing operation is performed. For example, if a data voltage VDAT corresponding to a 48-gray level is applied to at least one pixel PX in the selected pixel row during the active period, then after the sensing operation is performed on that pixel within the blank period, the same data voltage VDAT corresponding to the 48-gray level may be re-applied to the pixel as the previous data voltage PVD.

In some embodiments, the data driver 130 may be implemented with one or more integrated circuits. In other embodiments, the data driver 130 and the controller 190 may be implemented with a single integrated circuit, and the single integrated circuit may be referred to as a timing controller embedded data driver ("TED") integrated circuit.

The sensing circuit 150 may apply the initialization voltage VINIT to the plurality of pixels PX and the plurality of dummy pixels DPX through the plurality of sensing lines SL, or may perform a sensing operation that senses driving characteristics of the plurality of pixels PX through the plurality of sensing lines SL. For example, the sensing circuit 150 may measure a sensing current (or a sensing voltage) from a driving transistor T1 of at least one pixel PX through at least one sensing line SL to sense the driving characteristic (e.g., mobility and/or a threshold voltage) of the driving transistor T1.

In some embodiments, the sensing circuit 150 may include, but is not limited to, a sensing channel 155 that performs the sensing operation, an initialization switch SW_INIT that applies the initialization voltage VINIT to the sensing line SL in response to an initialization switching signal INIT_SWS, and a sampling switch SW_SPL that connects the sensing line SL to the sensing channel 155 in response to a sampling switching signal SPL_SWS. For example, the sensing channel 155 may include, but is not limited to, a sampling capacitor that accumulates the sensing current received from the driving transistor T1 through the sensing line SL, and an analog-to-digital converter that performs an analog-to-digital converting operation on a voltage of the sampling capacitor to generate digital sensing data. Although one sensing channel 155 is illustrated in FIG. 1, in some embodiments, the number of the sensing channels 155 of the sensing circuit 150 may be substantially equal to the number of the sensing lines SL of the display panel 110. In other embodiments, the sensing circuit 150 may include one sensing channel 155 per two or more sensing lines SL. In some embodiments, the sensing circuit 150 may be implemented as an integrated circuit separate from an integrated circuit in which the data driver 130 is formed. In other embodiments, the sensing circuit 150 may be included in the data driver 130, or may be included in the controller 190.

The scan driver 170 may generate the scan signal SC and the first sensing signal SS1 based on a scan control signal SCTRL received from a controller 190, and may sequentially provide the scan signal SC and the first sensing signal SS1 to the plurality of pixels PX and the plurality of dummy pixels DPX on a row-by-row basis in the active period of the frame period. For example, as illustrated in FIGS. 2 and 5, in an active period AP1 and AP2 of each frame period FP1 and FP2, the scan driver 170 may sequentially apply the scan signal SC_1, SC_2, . . . , SC_N and SC_N+1 and the first sensing signal SS1_1, SS1_2, . . . , SS1_N and SS1_N+1 to the plurality of pixels PX and the plurality of dummy pixels DPX on a row-by-row basis in the order from the scan signal SC_1 and the first sensing signal SS1_1 for the first pixel row PXR1 to the scan signal SC_N+1 and the first sensing signal SS1_N+1 for the (N+1)-th pixel row PXRN+1.

Further, as illustrated in FIG. 8, within a blank period BP of each frame period, to perform a sensing operation on the plurality of pixels PX in a selected pixel row (e.g., a K-th pixel row that is randomly selected from the first through N-th pixel rows PXR1 through PXRN), the scan driver 170 may apply the scan signal SC_K and the first sensing signal SS1_K to the plurality of pixels PX in the K-th pixel row. Further, after the sensing operation is performed on the plurality of pixels PX in the K-th pixel row, to apply the previous data voltages PVD to the plurality of pixels PX in the K-th pixel row, the scan driver 170 may apply the scan signal SC_K and the first sensing signal SS1_K to the plurality of pixels PX in the selected pixel row, or the K-th pixel row in a first period P1 (e.g., a rewrite period REWP) within the blank period BP. In addition, the scan driver 170 may apply the second sensing signal SS2 to the plurality of dummy pixels DPX in a second period P2 (e.g., a dummy initialization period DINIP) after the first period P1 within the blank period BP.

In some embodiments, the scan control signal SCTRL may include, but is not limited to, a scan start signal and a scan clock signal. Further, in some embodiments, the scan driver 170 may be integrated or formed in the display panel 110. For example, as illustrated in FIG. 1, the scan driver 170 may be integrated or formed in the peripheral region PR or the black matrix region BMR of the display panel 110. In other embodiments, the scan driver 170 may be implemented with one or more integrated circuits.

The controller 190 (e.g., a timing controller) may receive input image data IDAT and a control signal CTRL from an external processor (e.g., an application processor ("AP"), a graphics processing unit ("GPU") or a graphics card). In some embodiments, the control signal CTRL may include, but is not limited to, a vertical synchronization signal, a horizontal synchronization signal, an input data enable signal, a master clock signal, etc. In some embodiments, the controller 190 may receive the digital sensing data from the sensing circuit 150, and may generate the output image data ODAT by correcting the input image data IDAT based on the digital sensing data. Further, the controller 190 may generate the data control signal DCTRL and the scan control signal SCTRL based on the control signal CTRL. The controller 190 may control an operation of the data driver 130 by providing the output image data ODAT and the data control signal DCTRL to the data driver 130, and may control an operation of the scan driver 170 by providing the scan control signal SCTRL to the scan driver 170.

In some embodiments, the controller 190 may receive the input image data IDAT at a variable frame frequency VFF from the external processor, and may control the data driver 130, the sensing circuit 150 and the scan driver 170 to drive the display panel 110 at the variable frame frequency VFF. The controller 190 may provide the output image data ODAT to the data driver 130 at the variable frame frequency VFF to drive the display panel 110 at the variable frame frequency VFF. For example, as illustrated in FIG. 5, each frame period FP1 and FP2 may have the active period AP1 and AP2 having a constant time length, but a time length of the blank period BP1 and BP2 of each frame period FP1 and FP2 may be changed according to the variable frame frequency VFF. For example, as illustrated in FIG. 5, each frame period FP1 and FP2 may include active periods AP1 and AP2 with a constant duration, while the duration of the blank periods BP1 and BP2 may vary depending on the variable frame frequency VFF. For example, as the variable frame frequency VFF decreases, the time length of the blank period BP1 and BP2 may increase. In an example of FIG. 5, the display panel 110 may be driven at the variable frame frequency VFF of about 240 Hz in a first frame period FP1, and may be driven at the variable frame frequency VFF of about 48 Hz in a second frame period FP2. In some embodiments, the variable frame frequency VFF may vary within a range between a maximum frame frequency of about 240 Hz and a minimum frame frequency of about 48 Hz, but is not limited thereto. In some embodiments, a mode of the display device 100 that drives the display panel 110 at the variable frame frequency VFF may be referred to as a variable frame mode. For example, the variable frame mode may be, but is not limited to, a free-sync mode, a G-sync mode, etc.

The display device 100 according to an embodiment may perform the sensing operation (or a real-time sensing operation) on the plurality of pixels PX in a selected pixel row in a blank period (e.g., a vertical blank period) of each frame period. In some embodiments, the controller 190 randomly selects a pixel row on which the sensing operation is to be performed among the first through N-th pixel rows PXR1 through PXRN in each frame period, and the sensing circuit 150 performs the sensing operation on a plurality of pixels PX in the randomly selected pixel row in the blank period of the frame period. For example, as illustrated in FIG. 5, in a case where a K1-th pixel row is randomly selected among the first through N-th pixel rows PXR1 through PXRN in the first frame period FP1, where K1 is an integer from 1 to N, the scan driver 170 may provide the scan and first sensing signals SC_K1/SS_K1 to the K1-th pixel row in the blank period BP1 of the first frame period FP1, and the sensing circuit 150 may perform the sensing operation on the plurality of pixels PX in the K1-th pixel row. Further, in a case where a K2-th pixel row is randomly selected among the first through N-th pixel rows PXR1 through PXRN in the second frame period FP2, where K2 is an integer from 1 to N, the scan driver 170 may provide the scan and first sensing signals SC_K2/SS_K2 to the K2-th pixel row in the blank period BP2 of the second frame period FP2, and the sensing circuit 150 may perform the sensing operation on the plurality of pixels PX in the K2-th pixel row.

Further, after the sensing operation is performed on the plurality of pixels PX in the selected pixel row in each blank period BP1 and BP2, a data rewrite operation that writes the previous data voltages PVD to the plurality of pixels PX in the selected pixel row may be performed. However, in a case where the display panel 110 does not include the plurality of dummy pixels DPX, or in a case where the second sensing signal SS2 applied to the plurality of dummy pixels DPX is not used, as illustrated in FIG. 6, a voltage level of the initialization voltage VINIT when the data rewrite operation is performed in the blank period BP1 and BP2 may be lower than the voltage level of the initialization voltage VINIT when a data write operation that writes the data voltage VDAT to each pixel PX in the active period AP1 and AP2 is performed. For example, when the second sensing signal SS2 is not applied, the initialization voltage VINIT during the blank period may remain lower than during normal operation, because there's no trigger to raise it. This can cause increased luminance in the sensed pixel row, resulting in visible artifacts like horizontal bright lines.

A first timing diagram 210 of FIG. 6 illustrates an example of the initialization voltage VINIT when the first sensing signal SS1_K is applied to the K-th pixel row in the active period AP1 and AP2, and a second timing diagram 230 of FIG. 6 illustrates an example of the initialization voltage VINIT when the first sensing signal SS1_K is applied to the K-th pixel row to perform the data rewrite operation for the K-th pixel row after the sensing operation for the K-th pixel row is performed in the blank period BP1 and BP2. In an example of FIG. 6, when the data write operation for the plurality of pixels PX in the K-th pixel row is performed in the active period AP1 and AP2, the initialization voltage VINIT may be increased by the first sensing signal SS1_K+1 for a (K+1)-th pixel row at a falling edge FE of the first sensing signal SS1_K for the K-th pixel row. That is, before the data write operation for the K-th pixel row is finished, the data write operation for the (K+1)-th pixel row may be initiated, the source nodes NS of the plurality of pixels PX in the (K+1)-th pixel row may be initialized based on the initialization voltage VINIT, and the initialization voltage VINIT may be increased to initialize the source nodes NS of the plurality of pixels PX in the (K+1)-th pixel row. However, when the data rewrite operation for the plurality of pixels PX in the K-th pixel row is performed in the blank period BP1 and BP2, since the first sensing signal SS1 is not applied to the plurality of pixels PX in any other pixel row, the initialization voltage VINIT may not be increased at the falling edge FE of the first sensing signal SC1_K for the K-th pixel row. Thus, the voltage level of the initialization voltage VINIT when the data rewrite operation is performed in the blank period BP1 and BP2 may be lower than the voltage level of the initialization voltage VINIT when the data write operation is performed in the active period AP1 and AP2. In this case, in the pixel PX for which the data rewrite operation is performed, even if the previous data voltage PVD is substantially equal to the data voltage VDAT in the active period AP, the voltage difference between the previous data voltage PVD and the initialization voltage VINIT stored in the storage capacitor CST after the data rewrite operation may be greater than the voltage difference between the data voltage VDAT and the initialization voltage VINIT stored in the storage capacitor CST in the active period AP. For example, if a data rewrite operation is performed during the blank period without properly elevating the initialization voltage VINIT, the voltage difference stored in the storage capacitor CST may be larger than during a normal active period, even if the same data voltage is used.

Accordingly, a luminance of the K-th pixel row on which the sensing operation and the data rewrite operation are performed in the blank period BP1 and BP2 may be increased. For example, as illustrated in a timing diagram 250 of FIG. 7, in a case where the sensing operation for the K-th pixel row is performed in a third frame period FP3 and the sensing operation for the K-th pixel row is not performed in a fourth frame period FP4, the luminance L_PXRK of the K-th pixel row in the blank period BP4 of the fourth frame period FP4 may be substantially the same as a luminance in the active period AP3 and AP4 or a desired luminance. However, the luminance L_PXRK of the K-th pixel row after the sensing operation and the data rewrite operation are performed in the blank period BP3 of the third frame period FP3 may be increased compared with the desired luminance. Further, as the variable frame frequency VFF decreases, the time length of the blank period BP3 in which the luminance L_PXRK of the K-th pixel row undesirably increases may be increased, and a horizontal bright line corresponding to the K-th pixel row in the display panel 110 may be perceived by a user.

However, in the display device 100 according to an embodiment, the display panel 110 includes the plurality of dummy pixels DPX. As illustrated in FIG. 8, the scan driver 170 may apply the scan signal SC_K and the first sensing signal SS1_K to the plurality of pixels PX in the K-th pixel row on which the sensing operation is performed to provide the previous data voltages PVD to the plurality of pixels PX in the K-th pixel row in the first period P1 within the blank period BP. Subsequently, in a second period P2 following the first periods P1, the scan driver 170 may apply the second sensing signal SS2 to the plurality of dummy pixels DPX.

For example, in the display device 100 according to an embodiment, as illustrated in FIG. 8, the blank period BP may include an initialization period INIP, a sensing period SENP, a rewrite period REWP and a dummy initialization period DINIP. The first period P1 may be the rewrite period REWP, and the second period P2 may be the dummy initialization period DINIP.

In the case where the K-th pixel row is selected for the sensing operation from among the first through N-th pixel rows PXR1 through PXRN, the initialization period INIP may involve setting the initialization switching signal INIT_SWS to a high level and the sampling switching signal SPL_SWS to a low level. During this period, the sensing data voltage VSD may be applied to the plurality of data lines DL, and both the scan signal SC_K and the first sensing signal SS1_K may be applied at a high level to the plurality of pixels PX in the K-th pixel row. Thus, the sensing data voltage VSD may be applied to the gate node NG of each pixel PX in the K-th pixel row, and the initialization voltage VINIT may be applied to the source node NS of each pixel PX in the K-th pixel row.

In the sensing period SENP, the initialization switching signal INIT_SWS may have the low level, the sampling switching signal SPL_SWS may have the high level, the scan signal SC_K for the K-th pixel row may have the low level, and the first sensing signal SS1_K for the K-th pixel row may have the high level. Thus, the sensing channel 155 may be connected to the driving transistor T1 of each pixel PX in the K-th pixel row through the sensing transistor T3, the sensing line SL and the sampling switch SW_SPL, and may perform the sensing operation that senses the driving characteristic (e.g., the mobility and/or the threshold voltage) of the driving transistor T1 by measuring the sensing current (or the sensing voltage) from the driving transistor T1 of each pixel PX in the K-th pixel row.

In the rewrite period REWP or the first period P1, the initialization switching signal INIT_SWS may have the high level, the sampling switching signal SPL_SWS may have the low level, the previous data voltages PVD for the plurality of pixels PX in the K-th pixel row may be applied to the plurality of data lines DL, and the scan signal SC_K having the high level and the first sensing signal SS1_K having the high level may be applied to the plurality of pixels PX in the K-th pixel row. Thus, the previous data voltage PVD may be applied to the gate node NG of each pixel PX in the K-th pixel row, and the initialization voltage VINIT may be applied to the source node NS of each pixel PX in the K-th pixel row. In an embodiment, the previous data voltage PVD is the equal to or substantially equal to the data voltage VDAT that has been applied to each pixel PX in the K-th pixel row in an active period immediately before the blank period BP.

In the dummy initialization period DINIP after the rewrite period REWP, or in the second period P2 after the first period P1, the initialization switching signal INIT_SWS may have the high level, the sampling switching signal SPL_SWS may have the low level, and the second sensing signal SS2 having the high level may be applied to the plurality of dummy pixels DPX. Thus, the initialization voltage VINIT may be applied to the source node NS of each dummy pixel DPX, and the source node NS and the anode of the light-emitting element EL may be initialized based on the initialization voltage VINIT. In this case, as illustrated in FIG. 9, the voltage level of the initialization voltage VINIT when the data rewrite operation is performed in the blank period BP may be equal to or substantially equal to the voltage level of the initialization voltage VINIT when the data write operation is performed in the active period.

A first timing diagram 210 of FIG. 9 illustrates an example of the initialization voltage VINIT when the first sensing signal SS1_K is applied to the K-th pixel row in the active period, and a second timing diagram 270 of FIG. 9 illustrates an example of the initialization voltage VINIT when the first sensing signal SS1_K is applied to the K-th pixel row to perform the data rewrite operation in the first period P1 of the blank period BP. As illustrated in FIGS. 8 and 9, in a case where the first sensing signal SS1_K is applied to the K-th pixel row in the first period P1 of the blank period BP, and the second sensing signal SS2 is applied to the plurality of dummy pixels DPX in the second period P2 of the blank period BP, the initialization voltage VINIT may be applied to the source nodes NS of the plurality of pixels PX in the K-th pixel row through the plurality of sensing lines SL in the first period P1, and may be applied to the source nodes NS of the plurality of dummy pixels DPX through the plurality of sensing lines SL in the second period P2. That is, during the first period P1, the sensing transistor T3 of each pixel PX in the K-th pixel row may apply the initialization voltage VINIT to the source node NS. In the second period P2, the initialization transistor T4 of each dummy pixel DPX may apply the initialization voltage VINIT to the source node NS of the corresponding dummy pixel DPX. Further, as illustrated in FIGS. 8 and 9, the falling edge FE of the first sensing signal SS1 applied to the plurality of pixels PX in the K-th pixel row in the first period P1 may lag behind a rising edge RE of the second sensing signal SS2 applied to the plurality of dummy pixels DPX in the second period P2. That is, the rising edge RE of the second sensing signal SS2 may lead the falling edge FE of the first sensing signal SS1. In substantially the same manner that the initialization voltage VINIT is increased by the first sensing signal SS1_K+1 for the (K+1)-th pixel row at the falling edge FE of the first sensing signal SS1_K for the K-th pixel row within the active period, the initialization voltage VINIT may be increased by the second sensing signal SS2 at the falling edge FE of the first sensing signal SS1_K for the K-th pixel row within the blank period BP. That is, before completion of the data rewrite operation for the K-th pixel row, the initialization voltage VINIT may be increased to initialize the source nodes NS of the plurality of dummy pixels PX. Accordingly, as illustrated in FIG. 9, the voltage level of the initialization voltage VINIT at the falling edge FE of the first sensing signal SS1_K applied to the plurality of pixels PX in the K-th pixel row in the first period P1 may be equal to or substantially equal to the voltage level of the initialization voltage VINIT at the falling edge FE of the first sensing signal SS1_K applied to the plurality of pixels PX in the K-th pixel row in the active period.

Accordingly, in the display device 100 according to an embodiment, as illustrated in FIG. 10, when the sensing operation for the K-th pixel row is performed in the third frame period FP3 but not in the fourth frame period FP4, the luminance L_PXRK of the K-th pixel row may remain substantially equal to the desired luminance not only in the blank period BP4 of the fourth frame period FP4 but also in the blank period BP3 of the third frame period FP3, as shown in a timing diagram 290 of FIG. 10. This contrasts with the example of FIG. 7, where the luminance L_PXRK increases, as illustrated in timing diagram 250.

As described above, in the display device 100 according to an embodiment, the display panel 110 may include the plurality of pixels PX and the plurality of dummy pixels DPX. The scan driver 170 may apply the scan signal SC_K and the first sensing signal SS1_K to the plurality of pixels PX in the K-th pixel row on which the sensing operation is performed in the first period P1 within the blank period BP, and may apply the second sensing signal SS2 to the plurality of dummy pixels DPX in the second period P2 after the first period P1 within the blank period BP. Accordingly, a change (e.g., an increase) in luminance of the K-th pixel row on which the sensing operation is performed in the blank period BP may be reduced or prevented, and a horizontal bright line in the display panel 110 should not be perceived by a user.

Figure 11:
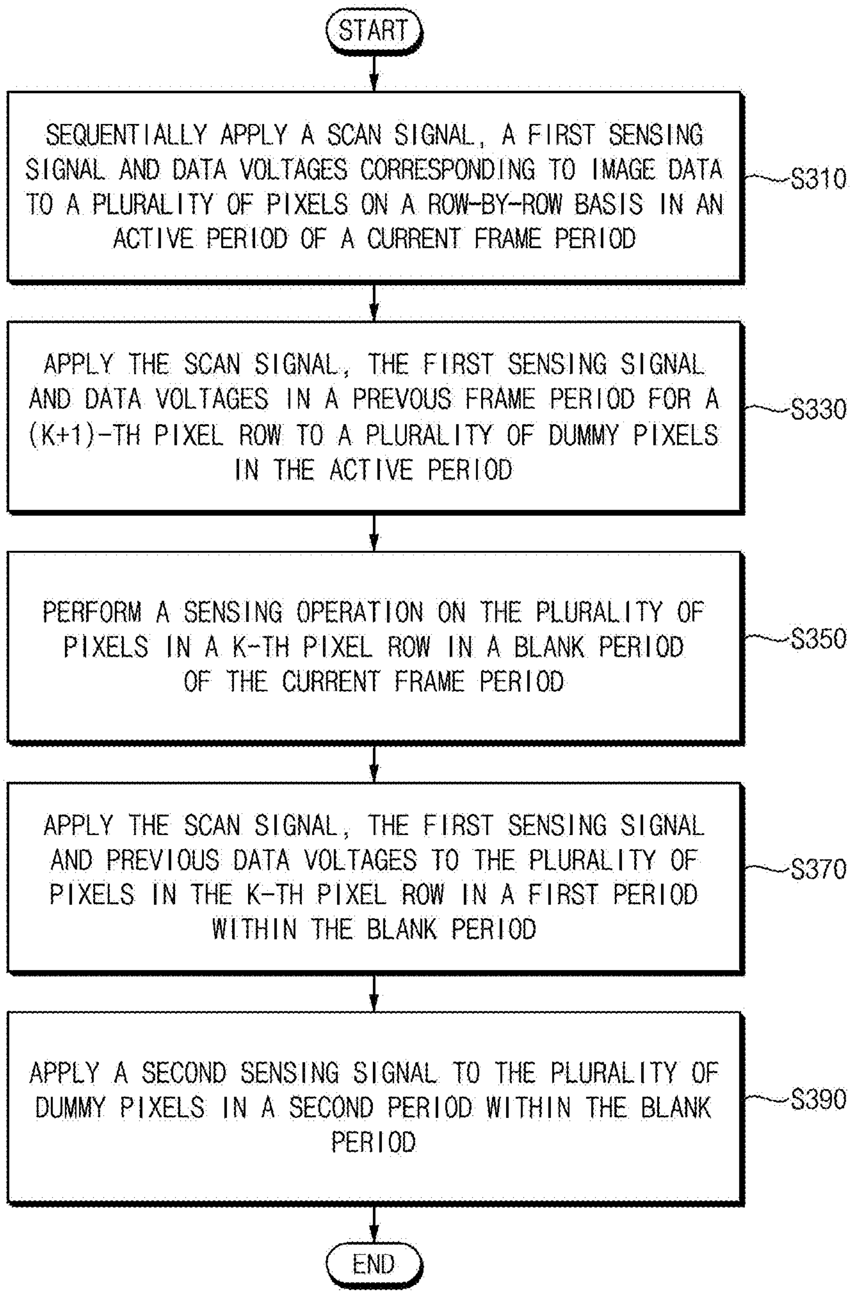
FIG. 11 is a flowchart illustrating a method of operating a display device according to an embodiment.
Figure 12:
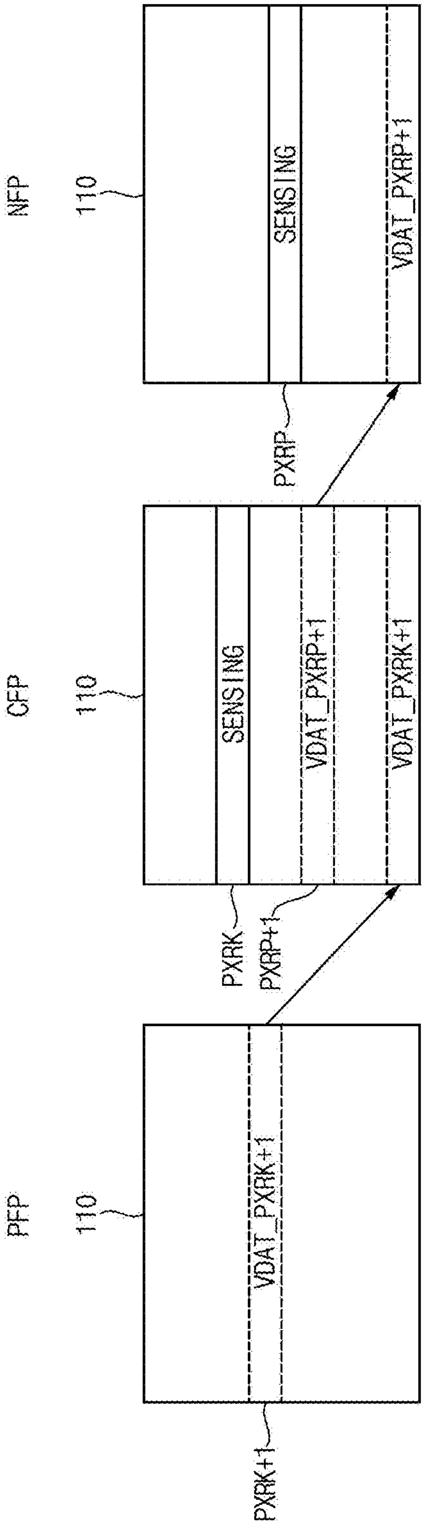
FIG. 12 is a diagram for describing an example of data voltages applied to a plurality of dummy pixels.

FIG. 11 is a flowchart illustrating a method of operating a display device according to embodiments, and FIG. 12 is a diagram for describing an example of data voltages applied to a plurality of dummy pixels Referring to FIGS. 1 and 11, in an active period of a current frame period, a display device 100 may sequentially apply a scan signal SC, a first sensing signal SS1, and data voltages VDAT corresponding to image data (e.g., input image data IDAT or output image data ODAT) to a plurality of pixels PX on a row-by-row basis (S310), and may apply the scan signal SC, the first sensing signal SS1, and data voltages VDAT that were applied to a next pixel row (i.e., a pixel row subsequent to the pixel row on which a sensing operation is to be performed) to a plurality of dummy pixels DPX (S330).

For example, as illustrated in FIG. 12, when a sensing operation is to be performed on a K-th pixel row among first through N-th pixel rows of a display panel 110 in a blank period of a current frame period CFP, data voltages VDAT_PXRK+1 that were applied to the plurality of pixels PX in a (K+1)-th pixel row PXRK+1 during a previous frame period PFP may be applied to the plurality of dummy pixels DPX during the active period of the current frame period CFP. In some embodiments, to prevent light emitted from the dummy pixels DPX from undesirably spreading beyond the intended area, the data voltages VDAT_PXRK+1 applied to the plurality of dummy pixels DPX may be set to a data voltage VDAT corresponding to a reference gray level (e.g., about a 100-gray level) or less, but are not limited thereto. Further, when a sensing operation is to be performed on a P-th pixel row among the first through N-th pixel rows of the display panel 110 during a blank period of a next frame period NFP, where P is an integer from 1 to N, the data voltages VDAT_PXRP+1 applied to the plurality of pixels PX in a (P+1)-th pixel row PXRP+1 during the current frame period CFP may be applied to the plurality of dummy pixels DPX during an active period of the next frame period NFP.

Referring again to FIGS. 1 and 11, in a blank period of the current frame period, the sensing operation may be performed on the plurality of pixels PX in the K-th pixel row (S350). After the sensing operation is performed, the scan signal SC, the first sensing signal SS1 and previous data voltages (or the data voltages VDAT applied to the plurality of pixels PX in the K-th pixel row in the active period of the current frame period) may be applied to the plurality of pixels PX in the K-th pixel row in a first period within the blank period (S370), and a second sensing signal SS2 may be applied to the plurality of dummy pixels DPX in a second period after the first period within the blank period (S390). The data voltages VDAT_PXRK+1 stored in the plurality of dummy pixels DPX when the plurality of pixels PX in the K-th pixel row receive the first sensing signal SS1 in the first period may be equal to or substantially equal to the data voltages VDAT_PXRK+1 stored in the plurality of pixels PX in the (K+1)-th pixel row when the plurality of pixels PX in the K-th pixel row receive the first sensing signal SS1 in the active period of the current frame period. Accordingly, the increase in the initialization voltage VINIT by the second sensing signal SS2 in the blank period may be the same or substantially the same as the increase in the initialization voltage VINIT by the first sensing signal SS1 for the (K+1)-th pixel row in the active period, and the increase in luminance of the K-th pixel row on which the sensing operation is performed in the blank period may be reduced or prevented, and a horizontal bight line in the display panel 110 should not be perceived by a user.

Figure 13:
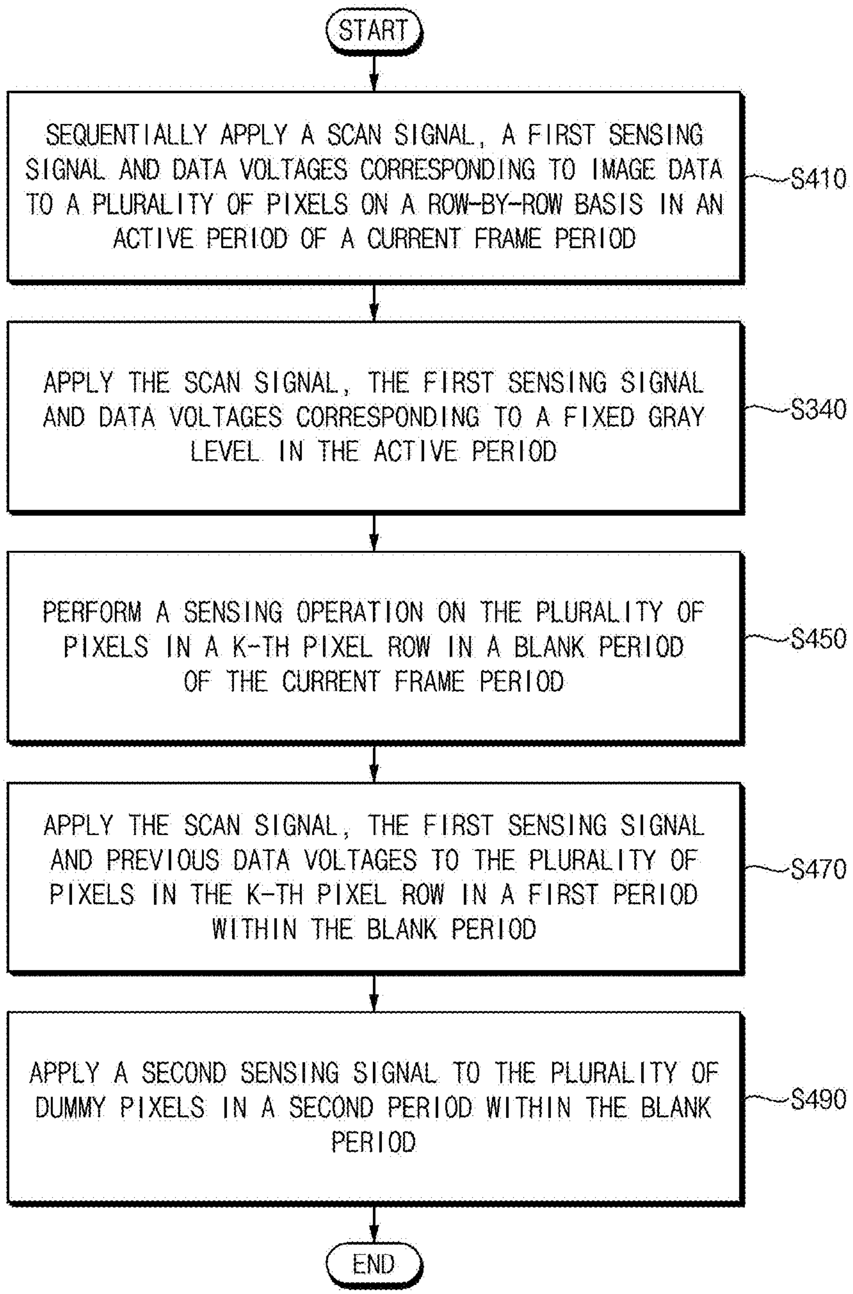
FIG. 13 is a flowchart illustrating a method of operating a display device according to an embodiment.

FIG. 13 is a flowchart illustrating a method of operating a display device according to an embodiment.

Referring to FIGS. 1 and 13, in an active period of a current frame period, a display device 100 may sequentially apply a scan signal SC, a first sensing signal SS1, and data voltages VDAT corresponding to image data (e.g., input image data IDAT or output image data ODAT) to a plurality of pixels PX on a row-by-row basis (S410), and may apply the scan signal SC, the first sensing signal SS1, and data voltages VDAT corresponding to a fixed gray level to a plurality of dummy pixels DPX (S430). In some embodiments, the fixed gray level may be, but is not limited to, a low gray level (e.g., a 16-gray level) or a gray level less than a predetermined threshold level.

In a blank period of the current frame period, a sensing operation may be performed on the plurality of pixels PX in a K-th pixel row (S450). After the sensing operation is performed, the scan signal SC, the first sensing signal SS1 and previous data voltages (or the data voltages VDAT applied to the plurality of pixels PX in the K-th pixel row in the active period of the current frame period) may be applied to the plurality of pixels PX in the K-th pixel row in a first period within the blank period (S470), and a second sensing signal SS2 may be applied to the plurality of dummy pixels DPX in a second period after the first period within the blank period (S490). In a conventional display device, an increase in luminance of a pixel row on which a sensing operation is performed may be perceived when a display panel displays a low-gray image. However, in the display device 100 according to at least embodiment, since the plurality of dummy pixels DPX store the data voltages VDAT corresponding to the fixed gray level or the low gray level, and the initialization voltage VINIT is increased by the second sensing signal SS2 in the blank period, the increase in luminance of the K-th pixel row on which the sensing operation is performed in the blank period may be reduced or prevented, and a horizontal bright line in a display panel 110 should not be perceived by a user.

The display device 100 according to embodiments may be applied to various electronic devices. An electronic device according to embodiments may include the display device 100 described above, and may further include a module or device having additional functions in addition to the display device 100.

Figure 14:
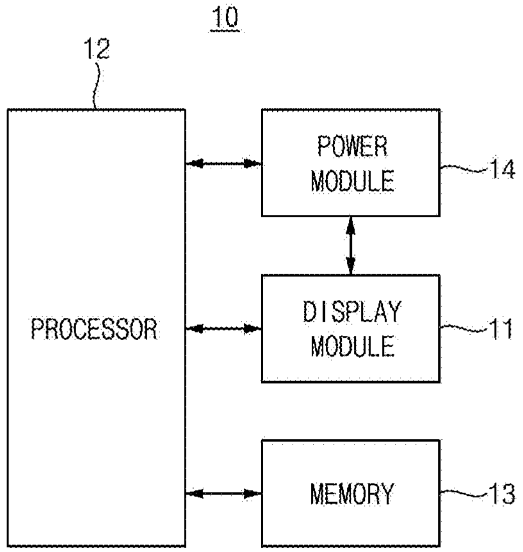
FIG. 14 is a block diagram illustrating an electronic device according to an embodiment.

FIG. 14 is a block diagram illustrating an electronic device according to an embodiment.

Referring to FIG. 14, an electronic device 10 according to an embodiment may include a display module 11, a processor 12, a memory 13 and a power module 14.

The processor 12 may include at least one of a central processing unit ("CPU"), an application processor ("AP"), a graphics processing unit ("GPU"), a communication processor ("CP"), an image signal processor ("ISP") and a controller.

The memory 13 may store data information necessary for an operation of the processor 12 or the display module 11. When the processor 12 executes an application stored in the memory 13, an image data signal and/or an input control signal may be transferred to the display module 11, and the display module 11 may output image information through a display screen by processing the received signal.

The power module 14 may include a power supply module such as a power adapter or a battery device, and a power conversion module that converts power supplied by the power supply module to generate power required for an operation of the electronic device 10.

At least one of the components of the electronic device 10 described above may be included in the display device according to embodiments described above. Further, some of individual modules functionally included in one module may be included in the display device, and other modules may be provided separately from the display device. For example, the display device may include the display module 11, and the processor 12, the memory 13 and the power module 14 may be provided in the form of other devices within the electronic device 10 other than the display device.

Figure 15:
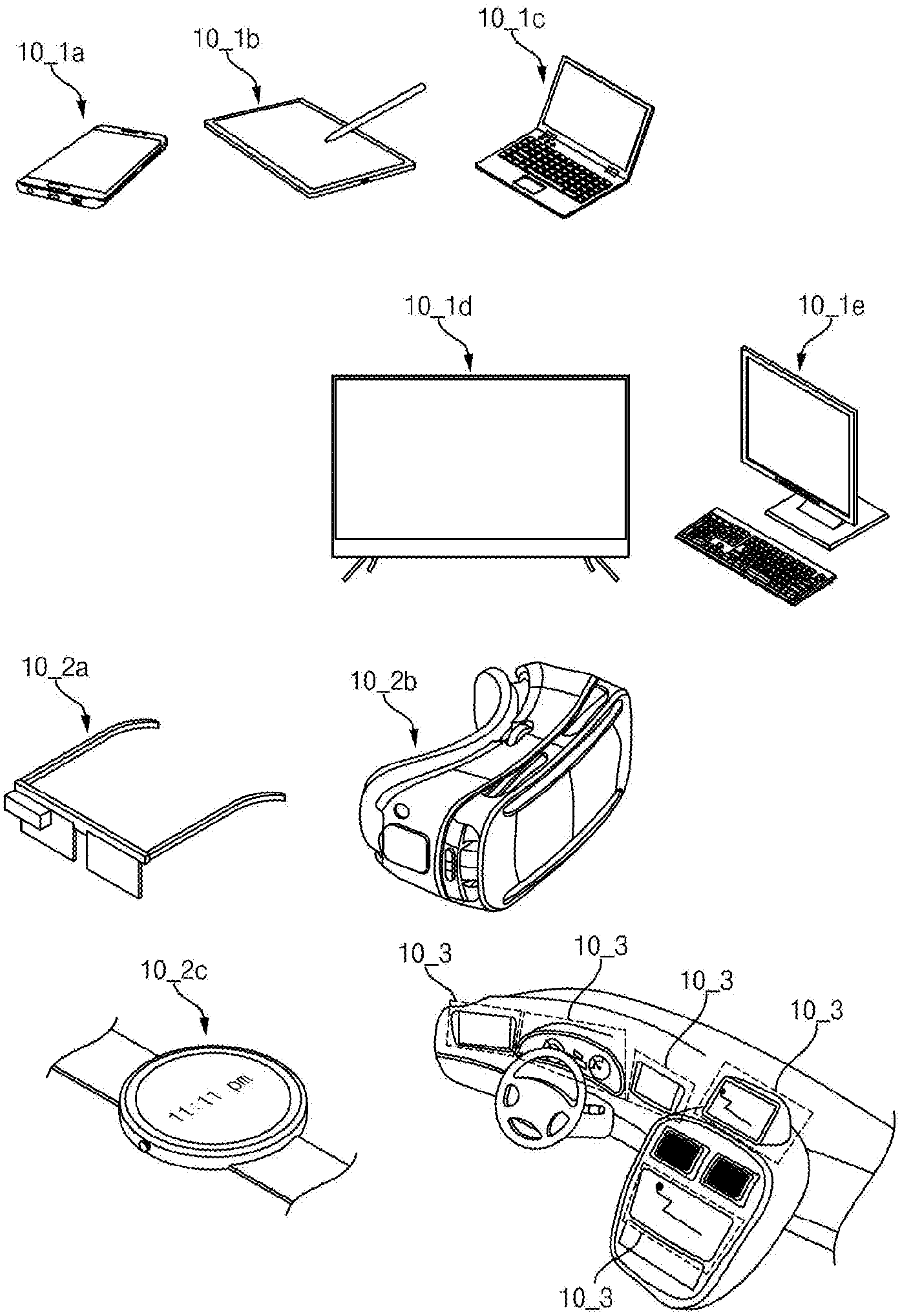
FIG. 15 is a schematic diagram of an electronic device according to various embodiments.

FIG. 15 is a schematic diagram of an electronic device according to various embodiments.

Referring to FIG. 15, various electronic devices to which the display device according to embodiments is applied may include not only image display electronic devices such as a smart phone 10_1*a*, a tablet personal computer ("PC") 10_1*b*, a laptop 10_1*c*, a television ("TV") 10_1*d* and a desk monitor 10_1*e*, but also wearable electronic devices including display modules such as smart glasses 10_2*a*, a head mounted display 10_2*b* and a smart watch 10_2*c*, and vehicle electronic devices 10_3 including display modules such as a center information display ("CID") arranged on an instrument panel, center fascia and dashboard of an automobile, and a room mirror display.

Figure 16:
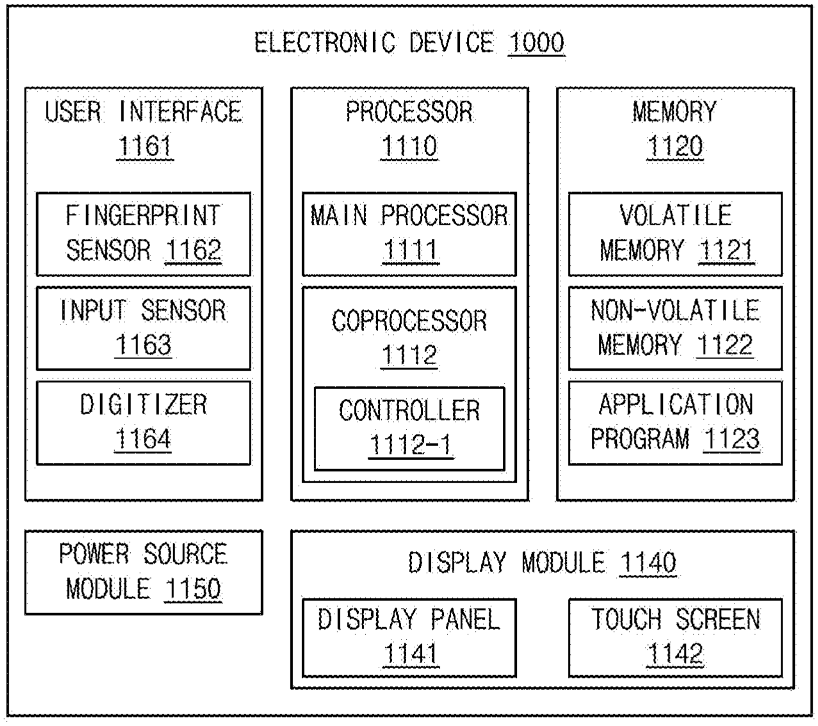
FIG. 16 is a block diagram illustrating an electronic device according to an embodiment.

FIG. 16 is a diagram illustrating an electronic device according to an embodiment of the present invention. Referring to FIG. 16, the electronic device 1000 according to one embodiment of the present invention may output various information (e.g., images, text, music, etc.) through a display module 1140, which, for example, may correspond to the display device shown in FIG. 1. When a processor 1110 (e.g., 12) executes an application stored in a memory 1120 (e.g., 13), the display module 1140 (e.g., 11) may provide application information to a user through a display panel 1141.

In some embodiments, the electronic device 1000 may be configured as a smartphone, camera, smart TV, monitor, smartwatch, tablet, automotive display, or AR/VR headset. For example, the electronic device 1000 may be a smartphone including a touch-sensitive display area DA for interaction and a non-display area NDA including sensors and circuits for enhanced functionality. For example, the electronic device 1000 may be a television or monitor including a large display area DA for high-resolution video playback and a non-display area NDA incorporating driving circuits or connectivity modules for external inputs. For example, the electronic device 1000 may be a smartwatch including a display area DA optimized for compact and high-clarity visuals and a non-display area NDA integrating biometric sensors for health monitoring. In some cases, the electronic device 1000 may be an AR/VR headset.

In some embodiments, memory 1120 may store information such as software codes for operating an application program 1123. The application program 1123 may include software designed to execute specific tasks or provide functionality to a user. The application program 1123 may operate under the control of the processor 1110 and utilizes data stored in the memory 1120 to deliver a wide range of features, such as productivity tools, multimedia streaming and playback, file or mail deliveries or communication services. The application program 1123 interacts seamlessly with the user interface 1161 or touch screen 1142, allowing a user to launch, navigate, and utilize the program through user inputs such as touch, tap, gesture, or voice interaction.

Upon user selection of an application via touch screen 1142 or user interface 1161, the processor 1110 may execute the application program 1123 corresponding to the selected application retrieved from the memory 1120 to perform functionalities of the application. For example, when a user selects a camera application by tapping the icon (or a camera application icon) presented on the display panel 1141, the processor 1110 activates a camera module. The processor 1110 may transmit image data corresponding to a captured image acquired through the camera module to the display module 1140. The display module 1140 may display an image corresponding to the captured image through the display panel 1141.

As another example, when a user wishes to make a phone call, the user taps the telephone icon displayed on the display module 1140, the processor 1110 may execute a phone application program stored in the memory 1120. A telephone keypad may be presented on the display panel 1141 for the user to enter a phone number to call.

As another example, the display module 1140 may be integrated into an electronic device 1000, such as a laptop computer, smart TV, or tablet. A user wishing to access a multimedia streaming application (e.g., to watch a music video or movie) can do so by tapping the corresponding icon. This action activates the application, allowing the user to view the streamed content.

The processor 1110 may include a main processor 1111 and an auxiliary or coprocessor 1112. The main processor 1111 may include a central processing unit (CPU). The main processor 1111 may further include one or more of a graphics processing unit (GPU), a communication processor (CP), and an image signal processor (ISP).

The coprocessor 1112 may include a controller 1112-1. The controller 1112-1 may include an interface conversion circuit and a timing control circuit. The controller 1112-1 may receive an image signal from the main processor 1111, convert the data format of the image signal to match the interface specifications with the display module 1140, and output image data. The controller 1112-1 may output various control signals to drive the display module 1140. For example, the controller 1112-1 may drive the display module 1140 to display the icon on the display screen suitable for selection by a user to cause execution of an application program 1123.

The memory 1120 may store one or more application programs 1123 and various data used by at least one component (for example, the processor 1110 or the user interface 1161) of the electronic device 1000 and input data or output data for commands related thereto. For example, a camera application program, a GPS application program, an augmented reality and virtual reality application program, and other application programs that can be executed by the processor 1110 upon selection of corresponding icons presented on the display screen (or display panel 1141) via the touch screen 1142 or user interface 1161 by the user. In addition, various setting data corresponding to user settings may be stored in the memory 1120. The memory 1120 may include volatile memory 1121 and non-volatile memory 1122.

The display module 1140 may output visual information (images) to the user. The display module 1140 may include the display panel 1141, a gate driver, the source driver, a voltage generation circuit, and a touch screen 1142. The display module 1140 may further include a window, a chassis, and a bracket to protect the display panel 1141. The display module 1140 may include at least a part of the configuration of the display device shown in FIG. 1.

The user interface 1161 serves as the interaction medium between a user and the electronic device 1000. The user interface 1161 may detect an input by a part (e.g., finger) of a user's body or an input by a pen or a mouse, and generate an electric signal or data value corresponding to the input. The user interface 1161 includes the fingerprint sensor 1162, the input sensor 1163, and a digitizer 1164.

The fingerprint sensor 1162 may sense a fingerprint for biometric recognition of the user and may also measure one or more biological signals such as blood pressure, moisture, or body mass.

The input sensor 1163 may sense user interactions including touch, tap, gesture, motion, spoken command, and eye movement. The input sensor 1163 includes optical sensors for image capture, eye tracking, or motion and gesture detection. Optical sensors may be infrared or semiconductor photodetectors. The input sensor 1163 includes audio and acoustic sensors, which may be MEMS microphones for voice recognition or sound-based interaction. The audio and acoustic sensors can be installed as part of the user interface 1161 or embedded in the display panel 1141.

The digitizer 1164 may generate a data value corresponding to coordinate information of input by a pen or a mouse to control movement of an onscreen cursor. The digitizer 1164 may generate the amount of change in electromagnetic due to the input as the data value. The digitizer may detect an input by a passive pen or transmit and receive data with an active pen or a remote.

At least one of the fingerprint sensor 1162, the input sensor 1163, or the digitizer 1164 may be implemented as a sensor layer formed on the top layer of the display panel 1141 through a continuous process with a process of forming elements (for example, the light emitting element, the transistor, and the like) included in the display panel 1141.

In addition, the user interface 1161 may further include, for example, a gesture sensor, a gyro sensor that senses rotational movements, an acceleration sensor to track translational movement, a grip sensor, a pressure sensor, a proximity sensor, a color sensor, an infrared (IR) emitter and camera sensor for tracking gaze direction and eye movements, a temperature sensor, or a light sensor. For example, the gyro sensor, acceleration sensor, and infrared emitter and camera may be particularly suitable for AR/VR headset functions.

The touch screen 1142 includes touch sensors embedded in semiconductor layers of the display panel 1141 to sense pressure applied to the top layer (screen) of the display panel 1141. The touch sensors can be a capacitive or a resistive type. The touch screen 1142 may serve as the primary interface for the user to select and navigate applications, control, and interact with the electronic device 1000.

The display panel 1141 (or display) may include a liquid crystal display panel, an organic light emitting display panel, or an inorganic light emitting display panel, and the type of the display panel 1141 is not particularly limited. The display panel 1141 may be of a rigid type or a flexible type that can be rolled or folded. The display module 1140 may further include a supporter, bracket, heat dissipation member, and the like that support the display panel 1141. The display module 1140 may be used to implement the display device 1060. The display panel 1141 may include the display unit shown in FIG. 1.

The power source module 1150 (e.g., 14) may supply power to the components of the electronic device 1000. The power source module 1150 may be used to implement the power supply 1050. The power source module 1150 may include a battery that charges the power source voltage. The battery may include a non-rechargeable primary battery or a rechargeable secondary battery or fuel cell. The power source module 1150 may include a power management integrated circuit (PMIC). The PMIC may supply optimized power source to each of the components described above including the display module 1140.

The foregoing is illustrative of embodiments and is not to be construed as limiting thereof. Although a few embodiments have been described, those skilled in the art will readily appreciate that many modifications are possible in the embodiments without materially departing from the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A display device comprising:

a display panel including a plurality of data lines and a plurality of sensing lines, including a plurality of pixels in a display region, and further including a plurality of dummy pixels in a peripheral region adjacent to the display region;

a data driver connected to the plurality of pixels and the plurality of dummy pixels through the plurality of data lines;

a sensing circuit connected to the plurality of pixels and the plurality of dummy pixels through the plurality of sensing lines; and a scan driver configured to sequentially apply a scan signal and a first sensing signal to the plurality of pixels and the plurality of dummy pixels on a row-by-row basis in an active period of a frame period, to apply the scan signal and the first sensing signal to the plurality of pixels in a selected pixel row among the pixels in a first period within a blank period of the frame period, and to apply a second sensing signal to the plurality of dummy pixels in a second period after the first period within the blank period, wherein the application of the second sensing signal causes a voltage level of an initialization voltage at a time of a falling edge of the first sensing signal applied to the plurality of pixels in the selected pixel row in the first period to be substantially equal to a voltage level of the initialization voltage at a time of a falling edge of the first sensing signal applied to the plurality of pixels in the selected pixel row in the active period.

2. The display device of claim 1, wherein, in the first period, the initialization voltage is applied to source nodes of the plurality of pixels in the selected pixel row through the plurality of sensing lines, and wherein, in the second period, the initialization voltage is applied to source nodes of the plurality of dummy pixels through the plurality of sensing lines.

3. The display device of claim 1, wherein a falling edge of the first sensing signal applied to the plurality of pixels in the selected pixel row in the first period lags behind a rising edge of the second sensing signal applied to the plurality of dummy pixels in the second period.

4. The display device of claim 1, wherein data voltages applied to the plurality of dummy pixels in the active period of the frame period are data voltages applied to the plurality of pixels in a pixel row subsequent to the selected pixel row in an active period of a previous frame period.

5. The display device of claim 1, wherein data voltages applied to the plurality of dummy pixels in the active period of the frame period correspond to a fixed gray level.

6. The display device of claim 1, wherein the plurality of pixels are arranged in first through N-th pixel rows, where N is an integer greater than or equal to 2, and wherein the plurality of dummy pixels are arranged in an (N+1)-th pixel row.

7. The display device of claim 6, wherein the selected pixel row is randomly selected from the first through N-th pixel rows in each frame period.

8. The display device of claim 1, wherein the peripheral region is a black matrix region surrounding the display region.

9. The display device of claim 1, wherein the display panel is driven at a variable frame frequency, and wherein a time length of the blank period is changed according to the variable frame frequency.

10. The display device of claim 1, wherein each of the plurality of pixels and the plurality of dummy pixels comprises:

a driving transistor including a gate connected to a gate node, a first terminal which receives a first power supply voltage, and a second terminal connected to a source node;

a scan transistor configured to connect a corresponding data line among the plurality of data lines to the gate node in response to the scan signal;

a sensing transistor configured to connect a corresponding sensing line among the plurality of sensing lines to the source node in response to the first sensing signal;

a storage capacitor connected between the gate node and the source node; and a light-emitting element including an anode connected to the source node, and a cathode which receives a second power supply voltage, and wherein each of the plurality of dummy pixels further includes:

an initialization transistor configured to connect the corresponding sensing line to the source node in response to the second sensing signal.

11. The display device of claim 10, wherein the scan transistor includes a gate which receives the scan signal, a first terminal connected to the corresponding data line, and a second terminal connected to the gate node, wherein the sensing transistor includes a gate which receives the first sensing signal, a first terminal connected to the corresponding sensing line, and a second terminal connected to the source node, and wherein the initialization transistor includes a gate which receives the second sensing signal, a first terminal connected to the corresponding sensing line, and a second terminal connected to the source node.

12. The display device of claim 10, wherein the sensing transistor of each of the plurality of pixels in the selected pixel row applies an initialization voltage to the source node of each of the plurality of pixels in the selected pixel row in the first period, and wherein the initialization transistor of each of the plurality of dummy pixels applies the initialization voltage to the source node of each of the plurality of dummy pixels in the second period.

13. The display device of claim 10, wherein the blank period comprises:

an initialization period in which a sensing data voltage is applied to the gate node of each of the plurality of pixels in the selected pixel row and the initialization voltage is applied to the source node of each of the plurality of pixels in the selected pixel row;

a sensing period in which a sensing operation is performed on the plurality of pixels in the selected pixel row;

a rewrite period in which a previous data voltage is applied to the gate node of each of the plurality of pixels in the selected pixel row and the initialization voltage is applied to the source node of each of the plurality of pixels in the selected pixel row; and a dummy initialization period in which the initialization voltage is applied to the source node of each of the plurality of dummy pixels, and wherein the first period is the rewrite period, and the second period is the dummy initialization period.

14. The display device of claim 13, wherein the previous data voltage is substantially equal to a data voltage applied to each of the plurality of pixels in the selected pixel row in the active period.

15. The display device of claim 13, wherein the sensing circuit comprises:

a sensing channel configured to perform the sensing operation;

an initialization switch configured to apply the initialization voltage to the sensing line in response to an initialization switching signal; and a sampling switch configured to connect the sensing line to the sensing channel in response to a sampling switching signal.

16. A display device comprising:

a display panel including a plurality of data lines and a plurality of sensing lines, including a plurality of pixels in a display region, and further including a plurality of dummy pixels in a peripheral region adjacent to the display region;

a data driver connected to the plurality of pixels and the plurality of dummy pixels through the plurality of data lines;

a sensing circuit connected to the plurality of pixels and the plurality of dummy pixels through the plurality of sensing lines; and a scan driver configured to apply a scan signal and a first sensing signal to the plurality of pixels and the plurality of dummy pixels, and to further apply a second sensing signal to the plurality of dummy pixels, wherein each of the plurality of pixels and the plurality of dummy pixels comprises:

a driving transistor including a gate connected to a gate node, a first terminal which receives a first power supply voltage, and a second terminal connected to a source node;

a light-emitting element including an anode connected to the source node, and a cathode which receives a second power supply voltage, and wherein each of the plurality of dummy pixels further comprises:

an initialization transistor configured to connect a corresponding one of the sensing lines to the source node in response to the second sensing signal.

17. The display device of claim 16, wherein the scan driver sequentially applies the scan signal and the first sensing signal to the plurality of pixels and the plurality of dummy pixels on a row-by-row basis in an active period of a frame period, applies the scan signal and the first sensing signal to the plurality of pixels in a selected pixel row in a first period within a blank period of the frame period, and applies the second sensing signal to the plurality of dummy pixels in a second period after the first period within the blank period.

18. An electronic device comprising:

a processor;

a memory connected to the processor;

a power module connected to the processor; and a display device configured to receive input image data from the processor, and to display an image based on the input image data, the display device comprising:

a display panel including a plurality of data lines and a plurality of sensing lines, including a plurality of pixels in a display region, and further including a plurality of dummy pixels in a peripheral region adjacent to the display region;

a data driver connected to the plurality of pixels and the plurality of dummy pixels through the plurality of data lines;

a sensing circuit connected to the plurality of pixels and the plurality of dummy pixels through the plurality of sensing lines; and a scan driver configured to sequentially apply a scan signal and a first sensing signal to the plurality of pixels and the plurality of dummy pixels on a row-by-row basis in an active period of a frame period, to apply the scan signal and the first sensing signal to the plurality of pixels in a selected pixel row in a first period within a blank period of the frame period, and to apply a second sensing signal to the plurality of dummy pixels in a second period after the first period within the blank period, wherein data voltages applied to the plurality of dummy pixels in the active period of the frame period are data voltages applied to the plurality of pixels in a pixel row subsequent to the selected pixel row in an active period of a previous frame period.

19. The electronic device of claim 18, wherein each of the plurality of pixels and the plurality of dummy pixels comprises:

a driving transistor including a gate connected to a gate node, a first terminal which receives a first power supply voltage, and a second terminal connected to a source node; and a light-emitting element including an anode connected to the source node, and a cathode which receives a second power supply voltage, and wherein each of the plurality of dummy pixels further comprises:

an initialization transistor configured to connect a corresponding one of sensing lines to the source node in response to the second sensing signal.

* * * * *